United States Patent [19]

Nolley, Jr.

[11] Patent Number: 4,471,619

[45] Date of Patent: Sep. 18, 1984

[54] FRACTIONATION PROCESS WITH POWER GENERATION BY DEPRESSURIZING THE OVERHEAD VAPOR STREAM

[75] Inventor: John P. Nolley, Jr., Houston, Tex.

[73] Assignee: UOP Inc., Des Plaines, Ill.

[21] Appl. No.: 410,661

[22] Filed: Aug. 23, 1982

[51] Int. Cl.³ ............................................. F01K 17/00
[52] U.S. Cl. ...................................... 60/648; 60/649; 203/DIG. 20; 208/365
[58] Field of Search ................ 60/648, 649, 673, 676; 202/234; 203/DIG. 20; 208/347, 353, 365

[56] References Cited

U.S. PATENT DOCUMENTS

| | | | |
|---|---|---|---|
| 1,325,199 | 12/1919 | Jewell | 202/234 |
| 1,527,944 | 2/1925 | Wiggins | 208/365 |
| 3,032,482 | 5/1962 | Shoemaker | 203/DIG. 20 |
| 4,109,469 | 8/1978 | Carson | 60/676 |

FOREIGN PATENT DOCUMENTS 102287  8/1979  Japan .................................. 208/353

OTHER PUBLICATIONS

Chemical Engineering Progress, Mar. 1979, pp. 68–71, "Reducing the Energy Demand of Separation Processes" by W. F. Kenney.

Oil & Gas Journal, Jan. 28, 1980, pp. 137–148, "Low-Grade Refinery Heat Recovery Merits Attention" by D. J. Carpenter et al.

Primary Examiner—Stephen F. Husar
Attorney, Agent, or Firm—James R. Hoatson, Jr.; John F. Spears, Jr.; William H. Page, II

[57] ABSTRACT

A process is disclosed in which the overhead vapor stream of a fractionation column is utilized as the working fluid which is depressurized to drive a turbine. The turbine may be used to generate electricity which is then used within the fractionation process or in another process, with a preferred use of the electricity being to supply heat to the bottom of the fractionation zone. The turbine is integrated into the overhead system of the column and the turbine effluent enters the overhead condenser to form liquid which may be used as reflux to the column.

7 Claims, 1 Drawing Figure

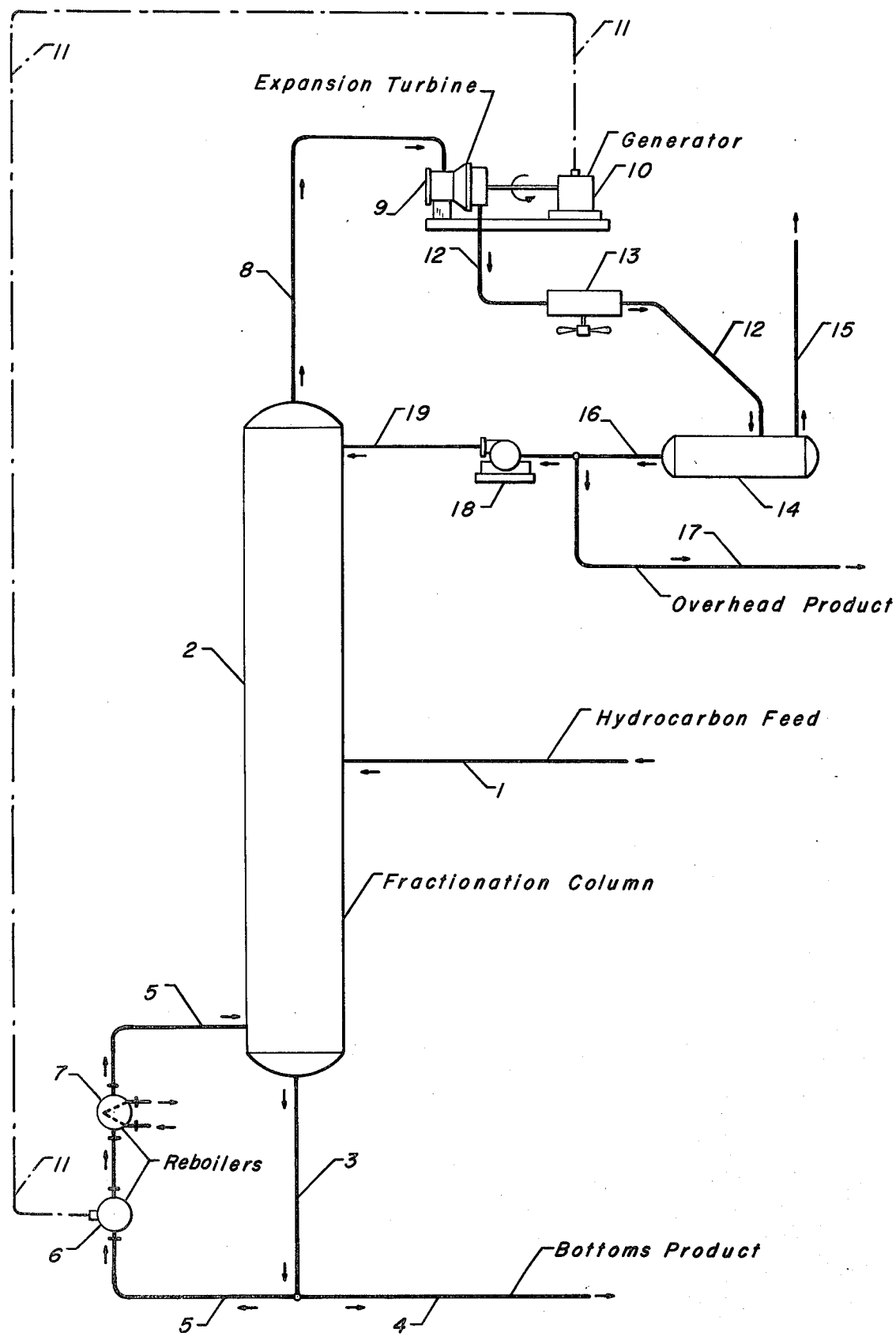

FRACTIONATION PROCESS WITH POWER GENERATION BY DEPRESSURIZING THE OVERHEAD VAPOR STREAM

FIELD OF THE INVENTION

The invention relates to a process for the fractional distillation or separation of volatile chemical compounds. The invention also relates to a process for generating useful mechanical or electrical power through the use of a working fluid which is depressurized through a turbine. The invention more specifically relates to energy conservation or energy conversion in a petroleum refinery or petrochemical complex. The invention therefore relates to a fractionation process in which electrical energy is generated by depressurizing the overhead vapor stream of a fractionation column in a turbine which drives an electrical generator and the electricity produced by the generator is utilized to supply a part of the heat needed to reboil the fractionation column.

PRIOR ART

Fractionation columns are employed in essentially all petroleum refineries and petrochemical complexes to separate volatile chemical compounds by fractional distillation. The design and operation of fractionation columns is therefore very familiar to those skilled in the relevant arts. As part of the fractionation process, heat is supplied to the bottom of the fractionation column to produce vapors which then rise upward through the column. This heat is normally supplied through the use of an indirect heat exchange means referred to as a reboiler. At the top of the column a vapor stream is removed which is rich in the most volatile chemical compounds charged to the column. This vapor stream is cooled and at least partially condensed to produce a liquid referred to as the overhead liquid. The liquid is collected in an overhead receiver which is typically at about the same pressure as the top of the column except for inherent flow related pressure drops. A portion of this liquid is returned to the column as a liquid stream referred to as reflux liquid, which may also contain the initial feed to the column. Another portion of the overhead liquid is often removed as a product stream.

These basic principles of fractionation are shown in articles appearing at page 68 of the Mar. 1979 issue of *Chemical Engineering Progress* and at page 137 of the Jan. 28, 1980 issue of the *Oil and Gas Journal*. These articles are also pertinent for their showing that the current direction of technological development in fractionation overhead systems is in the direction of energy recovery rather than power generation through the use of the overhead vapor as a working fluid.

U.S. Pat. No. 4,109,469 is directed to a process for power generation from petroleum refinery waste heat streams. A waste heat stream is a process stream which is at an elevated temperature which is normally considered too low for the commercially economical recovery of significant quantities of usable heat within the process. That is, although this stream is at an above ambient temperature, it is not hot enough to serve as a useful heating medium within the process or to generate steam having a useful pressure. This reference is pertinent for its showing that a working fluid may be vaporized using heat available in a petroleum refinery and that the working fluid vapor stream may then be depressurized through a turbine to generate electricity.

BRIEF SUMMARY OF THE INVENTION

The process provides a method of utilizing energy present in the overhead vapor stream of a fractionation column to perform useful work. This result is achieved by depressurizing the overhead vapor stream through a turbine, with the turbine being installed in an overhead system of a fractionation column which is in other respects similar to those overhead systems often employed on fractionation columns. The invention therefore provides an alternative method of utilizing this available energy as compared to conventional fractionation processes in which the overhead vapor is compressed as part of a heat-pumping system or used as a heat exchange medium.

One broad embodiment of the invention may be characterized as a fractionation process which comprises the steps of passing a feed stream comprising at least two volatile chemical compounds which are separable by fractional distillation into a fractionation zone operated at a superatmospheric pressure; removing a net bottoms stream which is rich in a less volatile first chemical compound from the fractionation zone; removing an overhead vapor stream which is rich in a more volatile second chemical compound from the fractionation zone, depressurizing the overhead vapor stream in a turbine, and then passing the overhead vapor stream through an overhead condensing means to thereby form an overhead liquid; and returning at least a portion of the overhead liquid to the fractionation zone as reflux.

DESCRIPTION OF THE DRAWING

The Drawing illustrates the preferred embodiment of the invention as it is employed to generate electricity used to reboil a fractionation column. The Drawing has been simplified to more clearly present the inventive concept by the elimination of certain mechanical features commonly employed in a process of this type including fractionation column internals, control valves, temperature and pressure control and recording systems, and turbine speed and bypass control systems, etc. This illustration of one embodiment of the subject invention is not intended to preclude from the scope of the inventive concept those other embodiments set out herein or which are the result of normal and expected modification of these embodiments.

Referring now to the Drawing, a hydrocarbon feed stream comprising a mixture of various xylenes together with a smaller amount of $C_9+$ aromatic hydrocarbons is passed into an intermediate point of a fractionation column 2 through line 1. A bottoms stream is removed from the fractionation column in line 3 and divided into two portions including a net bottoms stream which is removed from the process in line 4. The net bottoms stream removes $C_9$ hydrocarbons from the fractionation column at a flow rate approximately equal to the rate of $C_9+$ hydrocarbon addition by the feed stream. The remaining portion of the bottoms liquid stream is carried by line 5 through a first reboiler means 6 and a second reboiler means 7 wherein a portion of this bottoms liquid is at least partially vaporized, and the resultant fluids are passed into the lower portion of the fractionation column to supply the necessary heat input required for the operation of the fractionation column. This particular stacked reboiler configuration is shown only to emphasize the usage of two heat sources at the bottom of the column. Other arrangements including a single reboiler are very possible. The order of the two reboilers may be reversed with the electric reboiler being second in the flow.

The more volatile $C_8$ hydrocarbon components of the feed stream become concentrated in the hydrocarbons removed from the top of the fractionation column through line 8 as the overhead vapor stream of the column. The overhead vapor stream of the column is passed through an expansion or power recovery turbine 9 wherein it is depressurized to a substantially lower pressure. The effluent stream of the turbine is passed through line 12 into the overhead condenser 13 and then into the overhead receiver 14 of the column. Any relatively uncondensable material such as nitrogen, hydrogen, methane or other light hydrocarbons which is not condensed in the overhead condenser is removed from the process through line 15 as a vent gas stream. The liquid phase material which is produced by condensing the overhead vapor stream is removed from the overhead receiver in line 16 and is divided into a net overhead product stream which is rich in various xylene isomers and is removed from the process in line 17 and a second portion which is carried by line 19. The overhead liquid flowing through line 19 is pressurized in a pump 18 up to the operating pressure at the top of the fractionation column and is then returned to the fractionation column, preferably at the top tray of the fractionation column.

The expansion turbine 9 is connected through a rotating shaft or other drive means to an electrical generator 10. The expansion of the overhead vapor stream in the turbine thereby results in the rotation of internal components of the generator and the production of electrical energy which is carried by a conductor means 11. This electrical energy is converted to heat in the reboiler means 6. As the heat which is available from the electricity produced in the generator 10 may not be sufficient to reboil the column in the manner desired, a supplemental reboiler 7 is also illustrated on the Drawing. The supplemental reboiler would heat the bottoms liquid by indirect heat exchange against a suitable and available high temperature fluid such as high pressure steam, a high temperature heat transfer fluid or a high temperature pressure stream such as the overhead vapor stream or net bottoms stream of a different fractionation column.

DETAILED DESCRIPTION

Essentially every petroleum refinery or petrochemical processing unit utilizes one or more fractionation columns. These fractionation columns are utilized to separate different components of either the feed, intermediate products or final products of the processes which are performed in these units. Each of these fractionation columns shares a common method of operation which comprises the addition of heat to the bottom of the fractionation column for the purpose of generating vapors, which then travel upward through the fractionation column, followed by the removal of heat from a vapor stream which exits from the top of the fractionation column to cause the partial or total condensation of this vapor stream. All or only a portion of the liquid formed in this condensation is then returned to the top of the fractionation column as reflux. The reflux provides direct cooling and also provides liquid which flows downward through the upper section of the fractionation column to thereby maintain the necessary countercurrent vapor-liquid flow.

The large quantities of material which are separated in fractionation columns results in the necessity of adding a large amount of heat to the bottom of the fractionation column. The amount of heat energy input required is proportional to the amount of material which must be vaporized and "lifted" within the column including added reflux material. At the same time a correspondingly large amount, although not necessarily an equal amount, of energy must be removed in the condensation step in the overhead system of the fractionation column. The high cost of energy has prompted a great deal of research and activity into methods of more efficiently operating fractionation columns, and a large amount of this effort has been devoted to finding a way to more efficiently utilize the heat present in the overhead vapor stream of fractionation columns. This has lead to the development of systems such as those described in the previously cited articles.

It is normally difficult to efficiently recover energy from the overhead system of a fractionation column by utilizing its heat content. A basic reason for this is that the temperature of the overhead vapor stream is often rather low compared to the temperatures required by the available heat users. That is, a large percentage of the heat which must be removed from the overhead vapor stream of the fractionation column to effect the required cooling and condensation is in the form of "low level" heat which is available at temperatures below about 300° to 250° F. A large amount of this low level heat cannot be used in any practical manner and is therefore simply rejected from the process through the use of water or air as a cooling medium. The inefficiency or inability to recover useful heat from the overhead system of a fractionation column is also increased by the inevitable temperature difference across the indirect heat exchange surface used to transfer the recovered heat to the medium being heated.

It is an objective of the subject invention to provide a fractionation process for the separation of volatile chemical compounds in which useful energy is recovered from the overhead vapor stream of the fractionation column in the form of mechanical energy. It is another objective of the subject invention to increase the usefulness of energy recovered in the overhead system of a fractionation column. A direct objective of the subject invention is to provide a method of recovering energy available in the overhead vapor system of a fractionation column for use in the operation of the same or different fractionation column, preferably by aiding in the reboiling of the fractionation column. It is yet another objective of the subject invention to provide a process for generating electrical energy utilizing energy stored in the overhead vapor of a fractionation column to thereby allow the utilization of this energy at a point which is separated from the overhead system of the fractionation column by a significant distance.

In the subject process the overhead vapor stream of the fractionation column is depressurized through a turbine as the working fluid of a power generation cycle. The low pressure effluent of the turbine is then condensed in the overhead condensing system of the fractionation column to form a liquid, at least a portion of which is returned to the fractionation column. The reboiler system located at the bottom of the fractionation column is therefore the heat source of the power generation cycle and corresponds to the point at which the working fluid is vaporized and heated in a conventional power cycle. However, in the subject process a discontinuous or changing working fluid is utilized in that the composition of the liquid returned to the fractionation column from the overhead receiver is different from the composition of the material which is vaporized in the reboiler. The composition of the working fluid at the two "ends" of the power cycle is therefore different in the subject process. Nevertheless, the subject invention may be thought of as a power generation cycle in which a working fluid is vaporized, depressurized through a power recovery turbine, and then condensed to form the liquid which is pumped to the higher pressure at which the vapor stream is formed.

The motive or rotational energy produced in the turbine by the expansion of the overhead vapor stream is preferably used to operate an electrical generator. However, this rotational energy could be utilized in a number of other ways such as the operation of a compressor or other mechanical apparatus utilized in the process or in some other part of the industrial facility containing the fractionation column. The electricity produced by the generator is preferably utilized to supply heat to the fractionation zone from which the overhead vapor stream is removed. This electricity is therefore preferably utilized to supply at least a portion of the heat needed to reboil the fractionation zone. As the temperature of an electrically heated reboiler would be expected to be greater than a reboiler heated by a heat transfer fluid, the electrically heated reboiler would normally be used second in a series flow reboiler system. Heat produced from the electricity generated in the subject process could also be used to heat the feed stream to the column or to supply heat to an intermediate point in the column or to supply heat to a different fractionation zone. The electricity could however be utilized to operate electrical motors needed to drive pumps, conveyors or any other type of mechanical apparatus.

The electricity produced in the subject process can be very easily transported a significant distance from the overhead system of the fractionation column. This distance may be much greater than the distance which it is practical to transport the overhead vapor stream or a different fluid stream for the purpose of recovering heat from the overhead vapor stream. The subject invention therefore has the advantage of allowing the utilization of the recovered heat at a much greater distance than the prior art methods allow. A second advantage of the invention is that the heat released in the form of electrical heating may be at a significantly higher temperature than could be practically achieved through the use of a heat pump or other type of compression cycle in which it is attempted to recover the heat directly from the overhead vapor. Another potential advantage of the process is that it may be the most economical method of generating additional electrical power for use in the complex as supplemental or emergency power.

The subject process may be employed with a fractionation zone of essentially any configuration. The fractionation zone may therefore comprise two or more vertical vessels linked together to form a single separation zone or fractionation column. In this case the overhead vapor of a first vessel is passed into the bottom of a second vessel which merely forms an extension of the overall fractionation apparatus. The fractionation zone may be a packed column or a trayed column. It is preferred that the fractionation zone comprises a single trayed fractionation column contained in one vessel. The composition of the feed stream to the fractionation zone and the overhead vapor stream of the fractionation zone is also subject to considerable variation and does not form a limiting feature to the subject process. The composition of the overhead vapor stream does however limit the application of the subject process by its effect on the practicality of operating a commercial process utilizing the invention. That is, the composition of the overhead vapor stream must be such that the overhead vapor stream may be depressurized through the turbine over a practical pressure drop and may then be condensed at a practical temperature for the operation of the fractionation system. To be more specific, the composition of the overhead vapor stream must be such that it allows the commercially feasible operation of the fractionation column at a superatmospheric pressure which is sufficiently elevated that it is practical to depressurize the overhead vapor stream through a turbine and to then condense the resulting low pressure vapors. The composition of the overhead vapor stream must therefore allow the condensation of the overhead vapor at a temperature no lower than from about 60° to 150° F. at the reduced pressure downstream of the turbine. The ability to condense the overhead vapor at higher temperatures than this range is desirable. The overhead vapor stream must in addition not interfere in the operation of a turbine or in some manner lead to the damaging of the turbine as by the accumulation of solid deposits or coatings.

It is contemplated that the subject process may be utilized in fractionation zones used to separate aromatic hydrocarbons, alcohols, ketones, ethers, and various broad boiling hydrocarbon mixtures derived from petroleum such as isomerates, reformates, naphthas, light cycle oils, or close boiling mixtures of hydrocarbon isomers such as isoparaffins and normal paraffins, a mixture of an olefin and a paraffin of the same carbon number, and various solvent and extract streams. The fractionation zone may therefore be utilized in such varied processes as the fractionation of crude oil, the alkylation of paraffinic or aromatic hydrocarbons, liquid-liquid extraction processes, hydrocracking processes, hydrodealkylation processes, synthetic fuel production units, coal gasification units, and other petroleum and petrochemical operations. The subject process could be employed during the fractionation of relatively volatile compounds such as $C_2$, $C_3$ and $C_4$ hydrocarbons as in a natural gas liquids recovery unit which may be utilizing highly elevated pressures or cryogenic temperatures to affect the condensation of these relatively light compounds. The overhead vapor of the fractionation column could also be rich in an inorganic compound such as a halogenated solvent, water, an amine or a sulfur-containing compound.

The fractionation zone is preferably operated at conditions which include a superatmospheric pressure. It is further preferred that the operating pressure of the fractionation column, which is measured at the top of the fractionation column, is above about 30 psig. It is highly preferred that the fractionation zone is operated at a pressure above 150 psig. Increased fractionation column operating pressures provide a greater potential pressure reduction across the turbine and are therefore preferred to the extent that they do not unduly increase the capital or other operating cost of the fractionation zone because of the modifications required to accommodate the increased pressure. The process could therefore be utilized with a fractionation zone operating at a pressure up to 1000 psig or more although the operation of a fractionation column at this extremely elevated pressure is normally considered to be impractical. The temperature, reflux rate and other operating variables of the fractionation zone are set by the composition of the feed material and its thermodynamic properties. These operating variables of the fractionation zone may be determined in the same manner as for prior art fractionation processes. The use of the inventive concept should have only a minor effect on the operation of other parts of the fractionation system other than that which may result from the use of the elevated pressure or a desire to increase the heat flow or vapor flow upward through the fractionation column as part of the utilization of the inventive concept. Some adjustment may be necessary to compensate for any tendency of the pressure reduction to produce a greater separation of more volatile compounds from the liquefied compounds than would result when the pressure of the overhead receiver is close to the column operating pressure as in most fractionation processes.

It is preferred that the pressure differential across the turbine is at least 20 psia. That is, it is preferred that the pressures of the overhead vapor stream as it enters the turbine is at least 20 psig higher than the pressure at which it emerges from the turbine. It is especially preferred that this pressure differential is above 50 psia and it is very highly preferred that this pressure differential is at least 100 psia or more. This preference for a minimum pressure differential relates to the need for such a pressure differential to efficiently and economically recover energy from a gas stream through the use of an expansion or power recovery turbine. The preference for higher pressure differentials is the result of the fact that the amount of energy which may be recovered is proportional to the pressure drop across the turbine.

The apparatus required to perform the subject process should be available commercially, and may be chosen from equipment now being employed to perform similar functions in petroleum refineries and petrochemical complexes. The type of turbine utilized is not a limiting factor. The use of an axial flow turbine similar to those employed in the power recovery units of fluidized catalytic cracking unit catalyst regeneration zones is preferred. The design and operation of the other components of the overhead system including the overhead condenser and overhead receiver may be according to established engineering practices. Provision must be made however for the increased pressure differential of the subject process and for turbine control systems which may cause the overhead vapor stream to bypass the turbine during shutdown or startup of the turbine.

To ensure a complete understanding of the invention the following example is presented. This example is based on the calculated performance of a commercial scale fractionation column used to separate a feed stream comprising xylenes and heavier aromatics into a net overhead stream comprising mixed xylenes and a net bottoms stream comprising $C_9$-plus aromatics. The feed stream has a flow rate of about 63,700 lb/hr and enters an intermediate point of the column. At the bottom of the column a reboiler adds heat at the rate of approximately 59,000,000 BTU/hr. At the top of the column an overhead vapor stream is removed at the rate of approximately 281,600 lb/hr. This overhead vapor stream has a temperature of about 218° C. and a pressure of about 60 psig. The overhead vapor stream is passed into a power recovery turbine and expanded to a pressure of about 10 psig. Assuming an 85% efficiency for the turbine, there is developed useful mechanical energy equal to about 1,700 horsepower which is used to operate a generator and produce about 1,200 kilowatts/hour of electrical energy. The overhead vapor stream, or turbine effluent, is then passed into an overhead condenser and cooled to approximately 154° C. The effluent of the overhead condenser is passed into an overhead receiver operating at a pressure near 5 psig. About 44,800 lb/hr of the liquid collected in the overhead receiver is removed as the net overhead stream and the remainder is passed into the top of the fractionation column as reflux. The electrical power generated by depressurizing the overhead vapor is used in reboiling the column.

I claim as my invention:

1. A fractional distillation process which comprises the steps of:
   (a) passing a feed stream containing volatile hydrocarbon compounds having different degrees of volatility into a fractionation zone operated at a pressure above about 30 psig;
   (b) removing a net bottoms stream comprising the less volatile hydrocarbon compound from the fractionation zone;
   (c) removing an overhead vapor stream comprising the more volatile hydrocarbon compounds from the fractionation zone;
   (d) depressurizing the total overhead vapor stream in a turbine, and then passing said overhead vapor stream containing said more volatile hydrocarbon compounds through an overhead condensing means located after said turbine to form an overhead liquid; and
   (e) returning at least a portion of said overhead liquid from said overhead condensing means to the fractionation zone as a reflux stream.

2. The process of claim 1 further characterized in that the motive energy of the turbine is used to generate electricity.

3. The process of claim 2 further characterized in that electricity generated from the motive energy of the turbine is used to supply heat to the fractionation zone from which the overhead vapor stream is removed.

4. The process of claim 3 further characterized in that the electricity is utilized to reboil the fractionation zone.

5. The process of claim 1 further characterized in that the fractionation zone is operated at a pressure above 150 psig.

6. The process of claim 5 further characterized in that the feed stream is derived from petroleum and in that the feed stream is produced in a hydrocarbon conversion process.

7. The process of claim 1 further characterized in that at least 90 volume percent of the chemical compounds present in the overhead vapor stream have boiling points above about 420° F.

* * * * *